US011249582B2

(12) United States Patent
Kim et al.

(10) Patent No.: US 11,249,582 B2
(45) Date of Patent: Feb. 15, 2022

(54) DRIVING CIRCUIT, TOUCH DISPLAY DEVICE AND DRIVING METHOD THEREOF

(71) Applicant: LG Display Co., Ltd., Seoul (KR)

(72) Inventors: HoonBae Kim, Seoul (KR); SungChul Kim, Gyeonggi-do (KR); SunYeop Kim, Seoul (KR); Seongkyu Kang, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/882,363

(22) Filed: May 22, 2020

(65) Prior Publication Data
US 2020/0393947 A1  Dec. 17, 2020

(30) Foreign Application Priority Data
Jun. 11, 2019 (KR) .......................... 10-2019-0068977

(51) Int. Cl.
G06F 3/041 (2006.01)
G06F 3/0354 (2013.01)

(52) U.S. Cl.
CPC ...... G06F 3/04162 (2019.05); G06F 3/03545 (2013.01); G06F 3/0412 (2013.01)

(58) Field of Classification Search
CPC ............... G06F 3/04162; G06F 3/0412; G06F 3/03545; G06F 3/0442; G06F 3/0441; G06F 3/04184; G06F 3/04166; G06F 3/0443; G06F 2203/04106; G06F 3/0383; G09G 3/20; G09G 3/3674; G09G 3/3266; G09G 5/12; G09G 2354/00; G09G 2370/04
See application file for complete search history.

(56) References Cited

U.S. PATENT DOCUMENTS

| 2015/0160766 | A1* | 6/2015 | Park | G09G 3/3666 345/173 |
| 2016/0224175 | A1* | 8/2016 | Moon | G09G 3/20 |
| 2018/0150178 | A1* | 5/2018 | Kim | G06F 3/0443 |

FOREIGN PATENT DOCUMENTS

EP  3 051 531 A1  8/2016

OTHER PUBLICATIONS

European Search Report dated Sep. 30, 2020 issued in European Patent Application No. 20176203.6.

* cited by examiner

Primary Examiner — Temesghen Ghebretinsae
Assistant Examiner — Ivelisse Martinez Quiles
(74) Attorney, Agent, or Firm — Polsinelli PC

(57) ABSTRACT

A touch display device includes a first driving circuit supplying a gate signal to a part of a plurality of gate lines before a beacon period in which a beacon signal for an active stylus is generated, and a second driving circuit supplying the gate signal to another part of the plurality of gate lines after the beacon period ends, the touch display device and the driving method thereof may prevent display failure caused by the beacon signal for the active stylus.

17 Claims, 12 Drawing Sheets

DRIVING CIRCUIT, TOUCH DISPLAY DEVICE AND DRIVING METHOD THEREOF

CROSS REFERENCE TO RELATED APPLICATION

This application claims priority from Korean Patent Application No. 10-2019-0068977, filed on Jun. 11, 2019, which is hereby incorporated by reference in its entirety.

BACKGROUND

Field of the Disclosure

The present disclosure relates to a driving circuit, a touch display device, and a driving method thereof.

Description of the Background

Along with the development of the information society, demands for display devices that display images are growing. In this regard, various types of display devices, such as liquid crystal display (LCD), plasma display panel (PDP), and organic light emitting diode (OLED) display, have recently become popular.

Among these display devices, a liquid crystal display device displays an image by controlling the light transmittance of liquid crystals using an electric field. To this end, the liquid crystal display device is provided with a liquid crystal display panel in which liquid crystal cells are arranged in a matrix, and a driving circuit for driving the liquid crystal display panel.

In the pixel array of the liquid crystal display panel, a plurality of gate lines GL intersect a plurality of data lines DL, and thin-film transistors (TFTs) are formed at the intersections between the gate lines GL and the data lines GL, to drive the liquid crystal cells. Further, storage capacitors are formed on the liquid crystal display panel to maintain voltages at the liquid crystal cells, and each of the liquid crystal cells includes a pixel electrode, a common electrode, and a liquid crystal layer. An electric field is formed on the liquid crystal layer of the liquid crystal cells by a data voltage applied to the pixel electrodes and a common voltage Vcom applied to the common electrodes. Herein, as the intensity of light transmitted through the liquid crystal layer is controlled by the electric field, an image is displayed.

The driving circuit includes a gate driving circuit that sequentially supplies a gate output signal to the gate lines GL, and a data driving circuit that supplies an image signal (i.e., a data voltage) to the data lines DL. The data driving circuit supplies the data voltage to the liquid crystal cells by driving the data line DL. The gate driving circuit selects one horizontal line of liquid crystals each time in the display panel to which the data voltage is supplied by sequentially driving the gate lines GL.

The gate driving circuit includes a gate shift register having a plurality of stages to sequentially generate gate signals. Charging and discharging alternate with each other in each stage of the gate shift register, thereby outputting a gate clock signal and a gate output signal of a low-potential voltage level. The output terminals of the stages are coupled to the gate lines GL in a one-to-one correspondence. A gate signal of a first level is generated sequentially, one in each frame from the stages and provided to a corresponding gate line GL.

To provide a touch input function by a display device, an in-cell type touch display device with elements of a touch screen built in the display device has been developed and used to make a portable terminal, such as a smartphone or a tablet personal computer (PC), slim.

This touch display device uses a common electrode for driving each pixel also as an electrode for sensing touch. Therefore, a common voltage Vcom is provided to the common electrode in a display period, and a touch driving signal TDS is provided to the common electrode serving as a touch electrode in a touch period.

The touch display device is generally driven for touch only once during one frame (period) which is a refresh rate of a touch screen panel or one period of a frame frequency. For example, given a frame frequency of 60 Hz, display device is driven for touch during a predetermined interval within a time period of 1/60 s after display driving by turning on or off pixels through N gate lines GL included in the touch screen panel TSP. Therefore, this is equivalent to a touch report rate of 60 Hz.

For a touch function on the touch display device, an active stylus capable of transmitting and receiving signals to and from the display panel as well as a passive stylus such as a finger may be used.

When the active stylus is used, the touch display device transmits a beacon signal including information about the touch screen panel to the active stylus. The active stylus determines the state of the touch screen panel using the beacon signal and performs a synchronization process.

The beacon signal transmitted to the active stylus by the touch display device is generated at a frequency of 120 Hz twice larger than the frequency 60 Hz of the touch display device and has an amplitude equal to or larger than a specific voltage (e.g., about 3V) to minimize the influence of external noise.

Because this beacon signal has a larger frequency than the touch display device, the beacon signal generated in the display period may cause display failure. Accordingly, it is necessary to transmit the beacon signal in a period during which display driving is not performed. As a result, when display driving and touch driving take place simultaneously, the beacon signal results in degradation of display quality since a display operation on the display device may not be stopped temporarily.

SUMMARY

The present disclosure provides a driving circuit, a touch display device, and a driving method thereof, which may prevent display failure caused by a beacon signal for an active stylus.

Further, the present disclosure provides a driving circuit, a touch display device, and a driving method thereof, which may prevent display failure caused by a beacon signal at higher frequency than a frame frequency.

Further, the present disclosure provides a driving circuit, a touch display device, and a driving method thereof, which may prevent degradation of display quality caused by a beacon signal, when display driving and touch driving are performed simultaneously.

Further, the present disclosure provides a driving circuit, a touch display device, and a driving method thereof, which may prevent display failure caused by a beacon signal by dividing a touch screen panel with respect to a beacon period.

In one aspect, the present disclosure may provide a touch display device including a display panel having a built-in touch screen panel including a plurality of touch electrodes, a gate driving circuit supplying a gate signal to a plurality of gate lines, a data driving circuit supplying a data voltage to a plurality of data lines, and a touch circuit supplying a touch driving signal to the display panel and sensing a pen touch of an active stylus based on a signal received in response to the touch driving signal, wherein the gate driving circuit may include a first gate driving circuit supplying the gate signal to a part of the plurality of gate lines before a beacon period in which a beacon signal for the active stylus is generated, and a second gate driving circuit supplying the gate signal to another part of the plurality of gate lines after the beacon period ends.

In another aspect, the present disclosure may provide a touch display device including a display panel having a built-in touch screen panel including a plurality of touch electrodes, a gate driving circuit supplying a gate signal to a plurality of gate lines, a data driving circuit supplying a data voltage to a plurality of data lines, and a touch circuit supplying a touch driving signal to the display panel and sensing a pen touch of an active stylus based on a signal received in response to the touch driving signal, wherein the gate driving circuit may include a dummy gate driving circuit corresponding to a beacon period in which a beacon signal for the active stylus is generated, a first gate driving circuit supplying a gate signal to a part of the plurality of gate lines before the beacon period, and a second gate driving circuit supplying the gate signal to another part of the plurality of gate lines after the beacon period ends.

In another aspect, the present disclosure may provide a driving circuit in a touch display device including a display panel having a built-in touch screen panel including a plurality of touch electrodes, a data driving circuit supplying a data voltage to a plurality of data lines, and a touch circuit supplying a touch driving signal to the display panel and sensing a pen touch of an active stylus based on a signal received in response to the touch driving signal, wherein the driving circuit may further include a first gate driving circuit supplying a gate signal to a part of a plurality of gate lines before a beacon period in which a beacon signal for the active stylus is generated, and a second gate driving circuit supplying the gate signal to another part of the plurality of gate lines after the beacon period ends.

In another aspect, the present disclosure may provide a driving circuit in a touch display device including a display panel having a built-in touch screen panel including a plurality of touch electrodes, a data driving circuit supplying a data voltage to a plurality of data lines, and a touch circuit supplying a touch driving signal to the display panel and sensing a pen touch of an active stylus based on a signal received in response to the touch driving signal, wherein the driving circuit may further include a dummy gate driving circuit corresponding to a beacon period in which a beacon signal for the active stylus is generated, a first gate driving circuit supplying a gate signal to a part of a plurality of gate lines before the beacon period, and a second gate driving circuit supplying the gate signal to another part of the plurality of gate lines after the beacon period ends.

In another aspect, the present disclosure may provide a driving method of a touch display device including a display panel having a built-in touch screen panel including a plurality of touch electrodes, a gate driving circuit supplying a gate signal to a plurality of gate lines, a data driving circuit supplying a data voltage to a plurality of data lines, and a touch circuit supplying a touch driving signal to the display panel and sensing a pen touch of an active stylus based on a signal received in response to the touch driving signal, wherein the driving method may include a first gate driving step of supplying the gate signal to a part of the plurality of gate lines before a beacon period in which a beacon signal for the active stylus is generated, and a second gate driving step of supplying the gate signal to another part of the plurality of gate lines after the beacon period ends.

According to aspects of the present disclosure, a driving circuit, a touch display device, and a driving method thereof which may prevent display failure caused by a beacon signal for an active stylus may be provided.

Further, according to aspects of the present disclosure, a driving circuit, a touch display device, and a driving method thereof which may prevent display failure caused by a beacon signal in a higher frequency than a frame frequency may be provided.

Further, according to aspects of the present disclosure, a driving circuit, a touch display device, and a driving method thereof which may prevent degradation of display quality caused by a beacon signal, when display driving and touch driving are performed simultaneously may be provided.

Further, according to aspects of the present disclosure, a driving circuit, a touch display device, and a driving method thereof which may prevent display failure caused by a beacon signal by dividing a touch screen panel with respect to a beacon period may be provided.

DESCRIPTION OF DRAWINGS

The above, features, and advantages of the present disclosure will be more clearly understood from the following detailed description, taken in conjunction with the accompanying drawings, in which.

DETAILED DESCRIPTION

Figure 1:
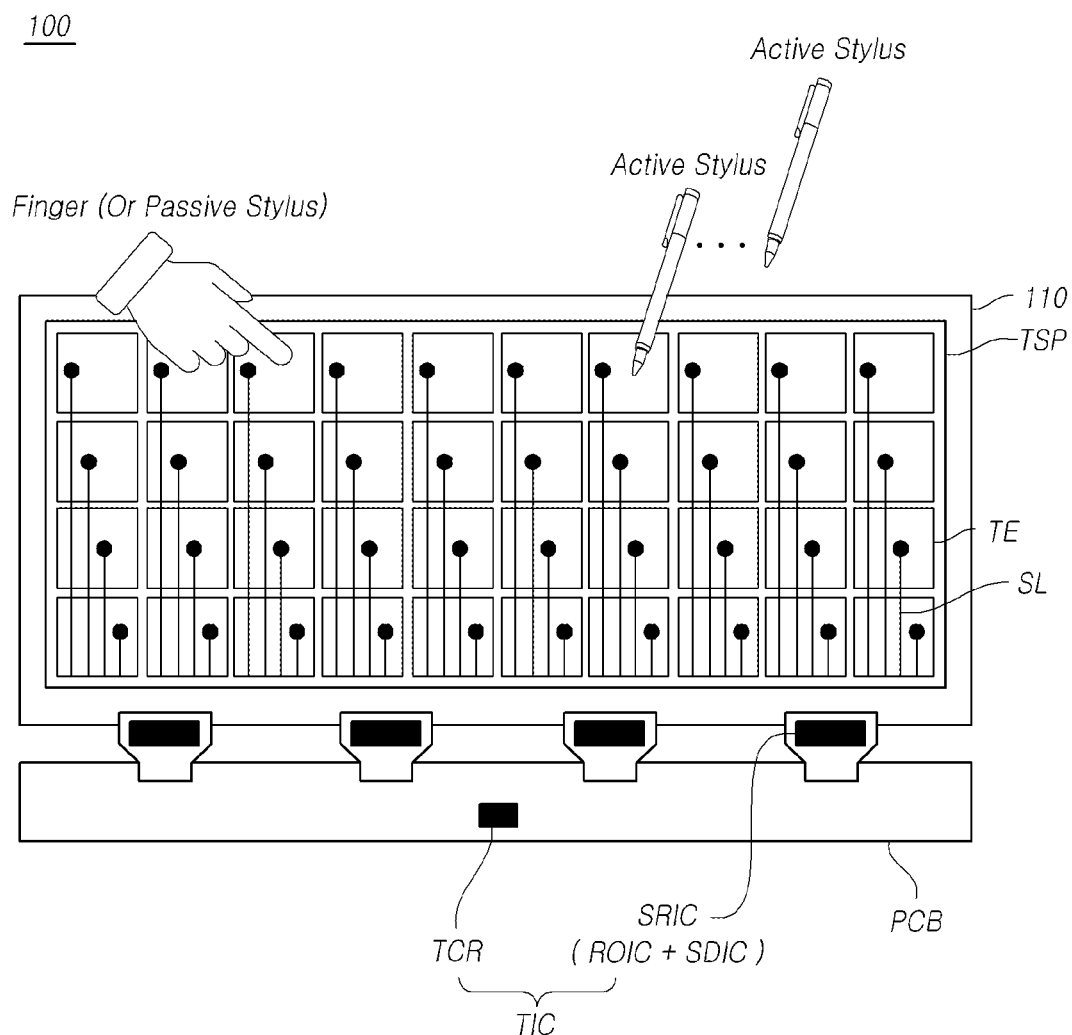
FIG. 1 is a diagram illustrating a touch display device according to aspects of the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram illustrating a touch display device according to aspects of the present disclosure.

Referring to FIG. 1, a touch display device 100 according to aspects of the present disclosure is a display device to provide a touch sensing function based on a passive stylus such as a finger and a pen touch sensing function (pen recognition function) based on an active stylus, as well as an image display function.

The touch display device 100 according to aspects of the present disclosure is a display device including a display panel 110 having a built-in touch screen panel with a plurality of touch electrodes TE as touch sensors. The touch display device 100 may be a television (TV), a monitor, or a mobile device such as a tablet personal computer (PC) or a smartphone.

For example, a common electrode used in a display period may be segmented into a plurality of blocks, and the blocks may be used as a plurality of touch electrodes TE in the touch display device 100.

In another example, a plurality of touch electrodes TE may be used as exclusive touch sensing electrodes (i.e., exclusive touch driving electrodes) in the touch display device 100.

The display panel 110 may be any of various types of panels including a liquid crystal display panel and an organic light emitting display panel.

For example, when the display panel 110 is a liquid crystal display panel, a common electrode that forms an electric field with a pixel electrode by receiving a common voltage Vcom may be segmented into a plurality of blocks, and the blocks may be used as a plurality of touch electrodes TE in the touch display device 100.

In another example, when the display panel 110 is an organic light emitting display panel, the touch display device 100 may include a first electrode, an organic light emission layer and a second electrode forming an organic light emitting diode, an encapsulation layer disposed on the second electrode and having an encapsulation function, and a touch sensor metal layer disposed on the encapsulation layer, and a plurality of touch electrodes TE may be formed in the touch sensor metal layer.

For the convenience of description, the following description is given on the assumption that a plurality of touch electrodes TE are used as touch driving electrodes (touch sensors) during touch period and as a common electrode during display period.

The touch display device 100 may include a touch circuit TIC that performs touch sensing and pen touch sensing, using a signal received through a touch screen panel TSP by driving the touch screen panel TSP.

This touch circuit TIC may include a first circuit receiving a signal through the touch screen panel TSP by driving the touch screen panel TSP, and a second circuit performing passive touch sensing (finger touch sensing) and active touch sensing, using a signal received through the touch screen panel TSP.

The first circuit is also referred to as a touch driving circuit ROIC, and the second circuit is referred to as a touch controller TCR.

The touch driving circuit ROIC may be implemented as an integrated driving circuit SRIC together with a data driving circuit SDIC that drives data lines.

The integrated driving circuit SRIC may be formed as a chip on film (COF) type mounted on a film or a chip on glass (COG) type formed on a glass substrate. While the COF type is taken as the integrated driving circuit SRIC herein by way of example, it will be obvious that the COG type is also available as the integrated driving circuit SRIC.

The film or glass on which the integrated driving circuit SRIC is mounted may be bonded with each of a bonding portion of the display panel 110 and a bonding portion of a printed circuit board (PCB).

The touch controller TCR and so on may be mounted on the printed circuit board.

The touch driving circuit ROIC and the data driving circuit SDIC may be implemented on separate driving chips. The touch driving circuit ROIC may be electrically coupled to the plurality of touch electrodes TE of the touch screen panel TSP through a plurality of signal lines SL.

The touch circuit TIC may perform touch sensing in a touch period separated from a display period in time division, and may also perform touch sensing in a touch period and a display period overlapped with each other.

Figure 2:
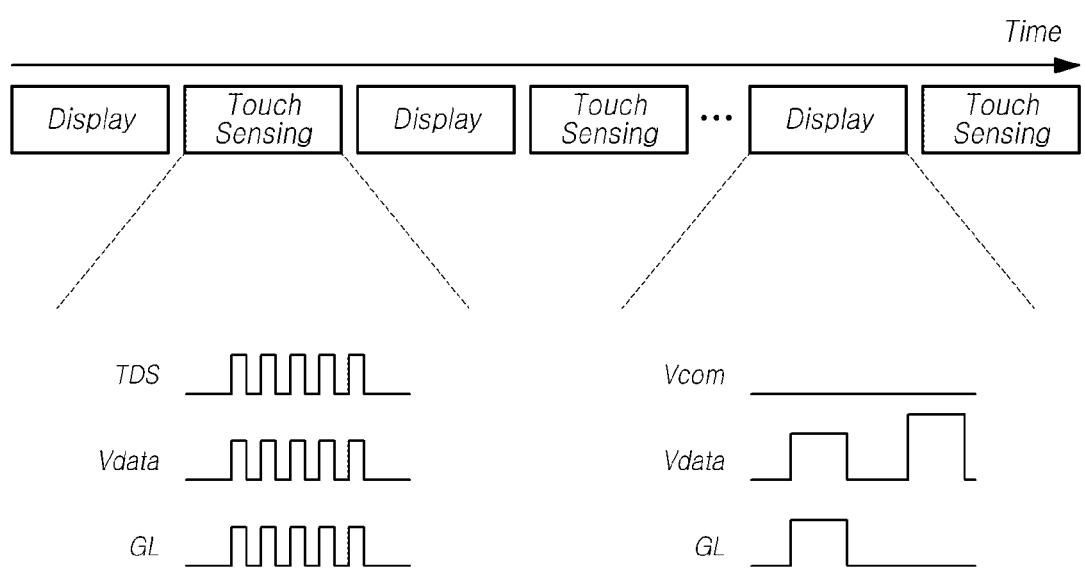
FIG. 2 is an exemplary diagram illustrating signal timings, when a display period and a touch period proceed separately in time division in the touch display device.

FIG. 2 is an exemplary diagram illustrating signal timings, when a display period and a touch period proceed separately in time division in the touch display device.

Referring to FIG. 2, the touch display device 100 according to aspects of the present disclosure may perform touch sensing by driving the touch electrodes TE of the touch screen panel TSP in a period (e.g., blank period) between display periods.

For example, the touch display device 100 may perform touch sensing in a vertical blank period defined per image frame or in a part of a plurality of horizontal blank periods defined in one image frame.

When a common electrode included in the touch screen panel TSP is used as touch electrodes TE, a common voltage Vcom may be applied to the touch electrodes TE through signal lines SL connected to the respective touch electrodes TE in a display period, and a touch driving signal TDS may be applied to the touch electrodes TE through the signal lines SL connected to the respective touch electrodes TE in a touch period. The touch driving signal TDS may be a pulse signal with a voltage magnitude changing over time.

Because display driving is not performed in the touch period, electrodes or signal lines for display driving may have no voltage or may be in a constant voltage state. Therefore, parasitic capacitance may be generated among a touch electrode TE to which the touch driving signal TDS is applied, a gate line GL, and a data line DL, thereby degrading the detection performance of a touch sensing signal by the parasitic capacitance.

To prevent the parasitic capacitance among the touch electrode TE, the gate line GL, and the data line DL, a signal corresponding to the touch driving signal TDS applied to the touch electrode TE may be supplied to the gate line GL and the data line DL in the touch period.

For example, a data voltage Vdata having the same amplitude and phase as those of the touch driving signal TDS may be supplied to the data line DL in the touch period in which touch sensing is performed. In the touch period, a gate low voltage VGL has been applied to the gate line GL. Therefore, the signal having the same amplitude and phase as those of the touch driving signal TDS may be output to the line to which the gate low voltage VGL is applied, so that the signal having the same amplitude and phase as those of the touch driving signal TDS is also supplied to the gate line GL.

As the signal having the same amplitude and phase as those of the touch driving signal TDS is supplied to the gate line GL and the data line DL in this manner, parasitic capacitance is not generated between the touch electrode TE and the signal line SL, thereby increasing the detection performance of the touch sensing signal.

In the display period in which display driving is performed, the data voltage Vdata may be applied at a specific level to a corresponding pixel.

Figure 3:
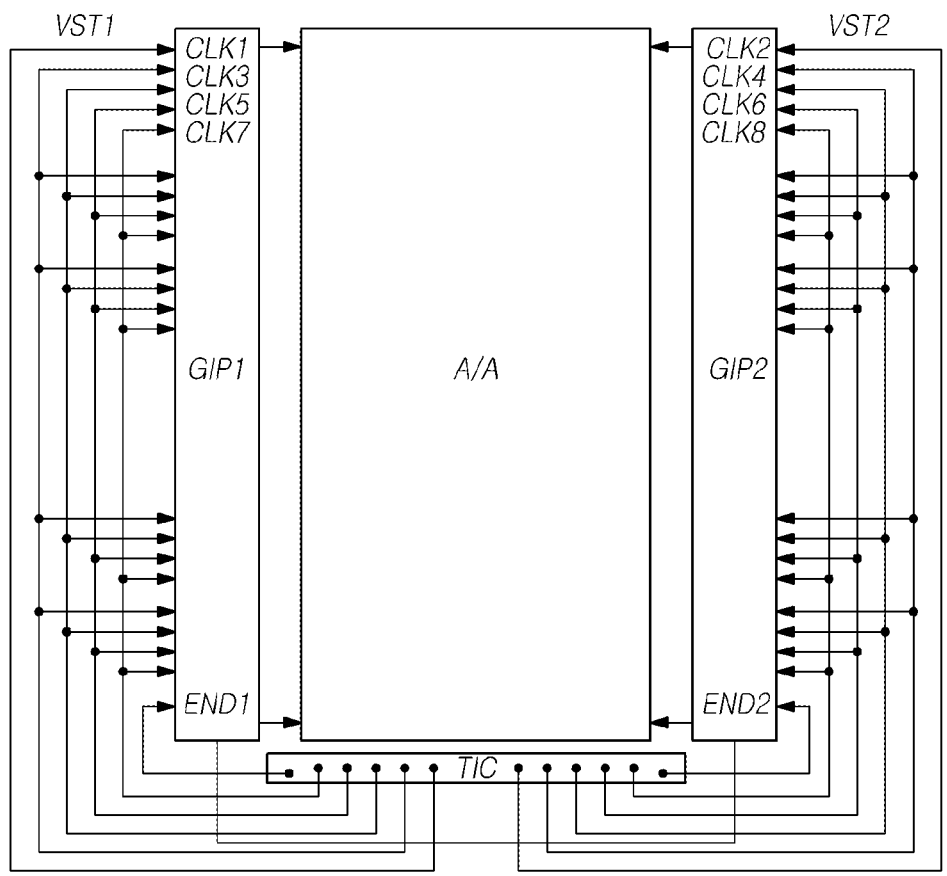
FIG. 3 is a diagram illustrating main signal lines for display driving and touch driving in the touch display device.

FIG. 3 is a diagram illustrating main signal lines for display driving and touch driving in the touch display device.

Referring to FIG. 3, it is assumed that the touch display device 100 includes a total of 1,280 gate lines GL. It is also assumed that gate driving circuits are disposed on both sides, and four gate clocks and one start pulse VST are applied to each gate driving circuit.

Each gate driving circuit may be formed directly on a glass substrate in a lower part of the display panel 110 by a thin-film transistor (TFT) array process based on gate in panel (GIP) structure. A gate driving circuit formed by GIP structure may be referred to as a GIP driving circuit.

The GIP driving circuit may be formed outside an active area A/A for displaying the data voltage Vdata on the display panel 110, on one or both sides of the display panel 110.

For a 60 Hz frame frequency (i.e., one frame period 1/60=16.7 ms), the touch display device 100 may use a certain starting time period (e.g., 10 ms) of one frame period as a display period in which an image is displayed by driving first gate line GL1 to 1280th gate line GL1280 together with a data line DL, and the remaining time period (e.g., 6.7 ms) as a touch period in which a touch signal is sensed by using the common electrode Vcom as touch electrode TE.

A plurality of clocks (e.g., CLK1, CLK3, CLK5, and CLK7), one odd-numbered start pulse VST1, and one odd-numbered end signal END1 may be applied to a first GIP driving circuit GIP1 located on the left side of the touch display device 100, whereas a plurality of clocks (e.g., CLK2, CLK4, CLK6, and CLK8), one even-numbered start pulse VST2, and one even-numbered end signal END2 may be applied to a second GIP driving circuit GIP2 located on the right side of the touch display device 100.

The signals applied to the first and second GIP driving circuits GIP1, GIP2 may be changed in position, and the numbers of start pulses and end signals applied to the first and second GIP driving circuits GIP1, GIP2 may be changed.

In the above structure, regarding the timings of the signals input to the first and second GIP driving circuits GIP1, GIP2, the first start pulse VST1 may be applied to the first GIP driving circuit GIP1 during the first 4Hs (1H to 4H), and the second start pulse VST2 may be applied to the second GIP driving circuit GIP2 during 4Hs (2H to 5H) after 1H from the initial input time.

Eight clocks CLK1 to CLK8 may be sequentially applied with a pulse width of 4H, starting after the first start pulse VST1 and the second start pulse VST2 are applied. Thus, a 4H 8 phase clock state is maintained.

In the case of the touch display device providing the touch sensing function based on an active stylus, signals may be exchanged for detecting the active stylus and synchronizing with the active stylus.

Figure 4:
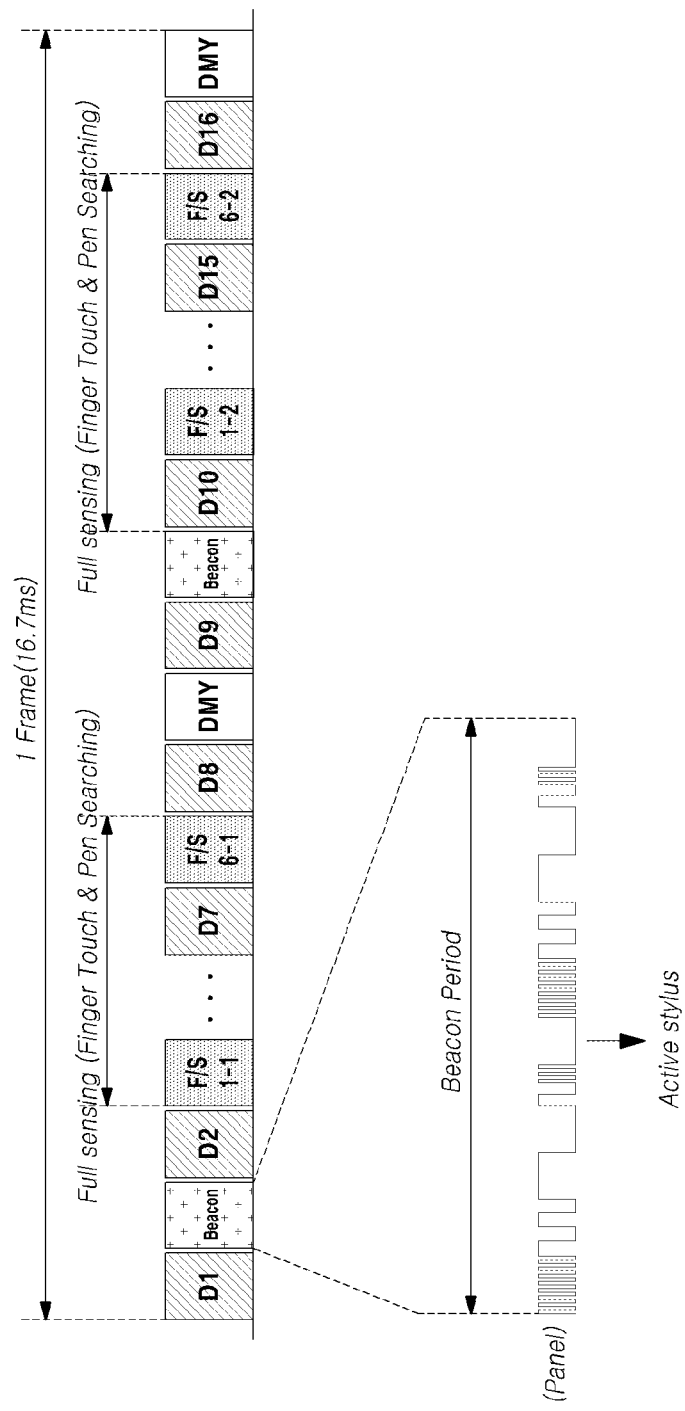
FIG. 4 is an exemplary diagram illustrating signal timings in pen searching mode in which an active stylus is searched for in the touch display device.

FIG. 4 is an exemplary diagram illustrating signal timings in pen searching mode in which an active stylus is searched for in the touch display device.

Referring to FIG. 4, a beacon signal Beacon may be transmitted from the touch display device 100 toward the active stylus in a beacon period during the pen searching mode in progress.

The beacon period may be selected from among periods excluding periods D1-D16 in which display driving is performed within one frame period, that is, from touch periods in which touch driving is performed, within one frame period. FIG. 4 illustrates a case in which the beacon signal Beacon is transmitted to the active stylus in a first touch period following the first display period D1.

The beacon signal Beacon may include information about the touch screen panel TSP, for example, identification information of the touch screen panel TSP, state information of the touch screen panel TSP, and driving frequency, and may be transmitted in a communication scheme such as spread spectrum.

Spread spectrum communication schemes may include, for example, direct sequence spread spectrum (DSSS), frequency hopping spread spectrum (FHSS), and so on.

In the touch periods excluding the beacon period in which the beacon signal Beacon is transmitted, a ping signal may separately be transmitted from the touch screen panel TSP to the active stylus to synchronize the touch driving signal TDS for driving the touch screen panel TSP and a driving signal of the active stylus.

The active stylus may generate and output a stylus signal synchronized to the touch driving signal TDS for driving the touch screen panel TSP, in response to reception of the ping signal.

For reference, in order to sense the active stylus in the touch periods, full sensing F/S, that is, sensing of the entire area of the touch screen panel TSP or local sensing L/S, that is, sensing of a partial area of the touch screen panel TSP may be performed.

As described above, the beacon signal Beacon for the active stylus may be transmitted from the touch screen panel TSP to the active stylus in a touch period in which display driving is not performed. Accordingly, when the display periods and the touch periods proceed separately in time division, a part of the touch periods may be selected and used as beacon periods in which the beacon signal Beacon is generated.

However, when display driving and touch driving are simultaneously performed, an operation of temporarily stopping the display driving and generating the beacon signal Beacon is required.

Figure 5:
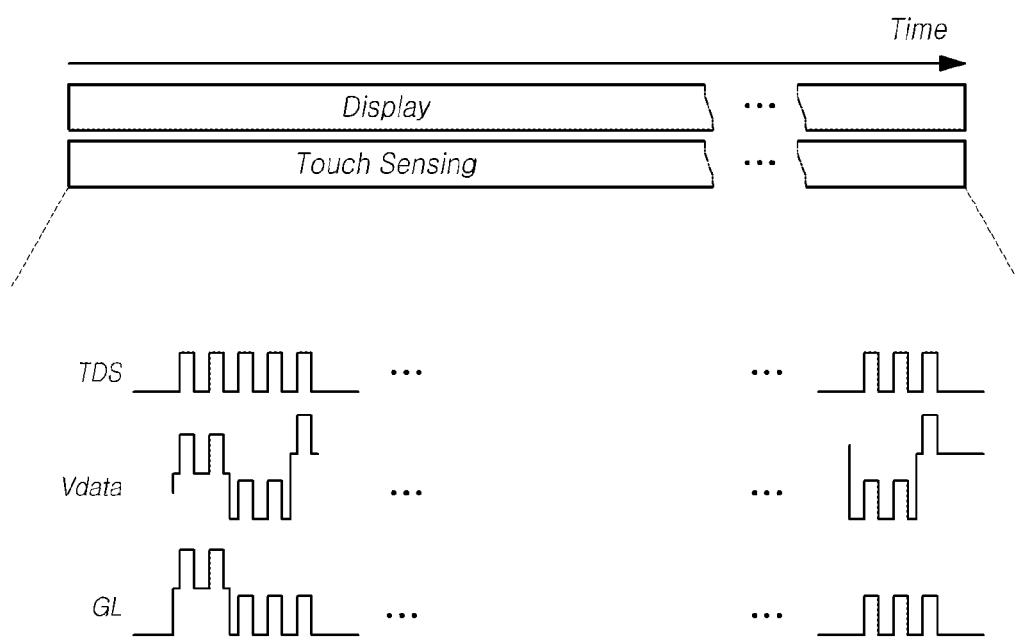
FIG. 5 is a diagram illustrating simultaneous display driving and touch driving in the touch display device according to aspects of the present disclosure.

FIG. 5 is a diagram illustrating a case in which display driving and touch driving are simultaneously performed in the touch display device according to aspects of the present disclosure.

Referring to FIG. 5, in the touch display device 100 according to aspects of the present disclosure, a display period in which display driving is performed and a touch period in which touch driving is performed may simultaneously proceed.

When touch driving and display driving are simultaneously performed, the touch driving signal TDS may be applied to the touch electrodes TE. Further, the data voltage Vdata may be supplied to the data lines DL for display driving, and a gate signal generated based on a high-level gate voltage VGH and a low-level gate voltage VGL may be output to the gate lines GL.

Accordingly, the data voltage Vdata may be output to each data line DL according to the timing of the gate signal applied through the gate lines GL, so that pixel electrodes represent brightness corresponding to image data.

When the common electrode included in the touch screen panel TSP is used as the touch electrodes TE, the touch driving signal TDS may be applied to the touch electrodes TE. Therefore, a voltage difference corresponding to image data may not be formed between the common electrode and the pixel electrodes to which the data voltage Vdata is applied.

That is, since the level of the touch driving signal TDS changes over time, a voltage difference corresponding to image data is not formed between the common electrode to which the touch driving signal TDS is applied and the pixel electrodes, the pixels may not represent the brightness corresponding to the image data.

Therefore, the voltage difference corresponding to the image data may be formed between the common electrode to which the touch driving signal TDS is applied and the pixel electrodes by applying the data voltage Vdata modulated based on the touch driving signal TDS to the data lines DL.

The modulation of the data voltage Vdata may be performed, for example, by modulating a gamma voltage used to generate the data voltage Vdata in the data driving circuit. Alternatively, the modulated data voltage Vdata may be supplied to the data lines DL by modulating a ground voltage on the touch screen panel TSP.

In addition, a modulated gate signal may be applied to the gate lines GL by modulating the low-level gate voltage VGL based on the touch driving signal TDS, so that the gate lines GL are normally driven.

Display driving and touch sensing may be performed simultaneously by modulating the data voltage Vdata applied to the data lines DL and the gate signal applied to the gate lines GL based on the touch driving signal TDS in this manner.

However, as described before, when display driving and touch driving are simultaneously performed, an operation of temporarily stopping the display driving and generating the beacon signal Beacon is required to transmit the beacon signal Beacon from the touch screen panel TSP toward the active stylus.

That is, because the beacon signal Beacon transmitted from the touch screen panel TSP to the active stylus is generally generated at a frequency of 120 Hz, twice the frequency of 60 Hz, which is the frequency of the touch display device 100, a signal timing may be formed such that the beacon signal Beacon is generated at least once within a display period.

Figure 6:
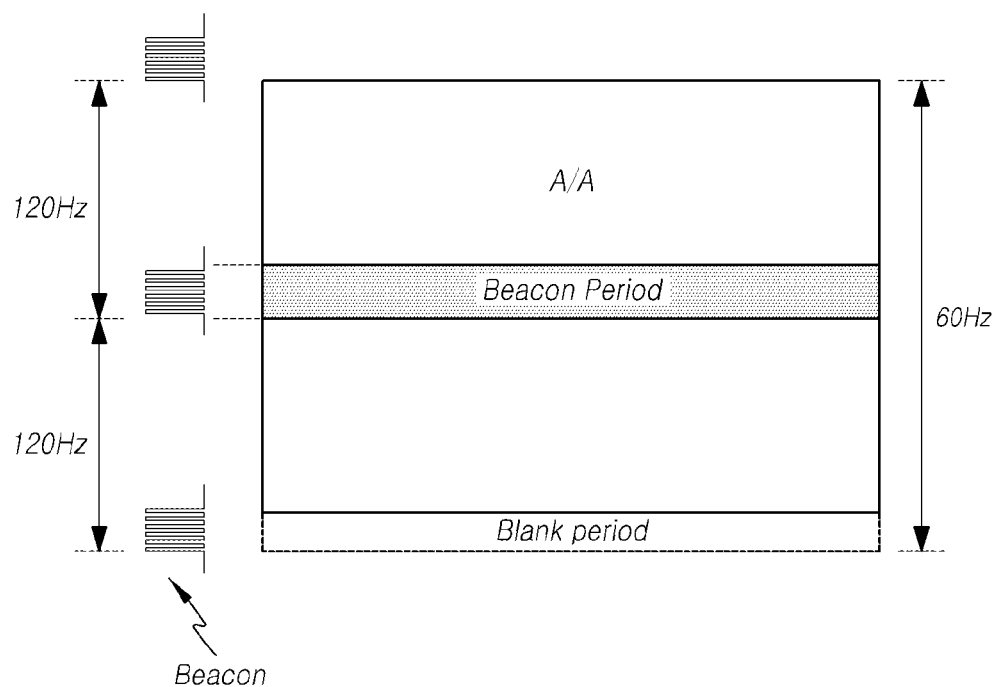
FIG. 6 is a conceptual diagram illustrating display failure caused by a beacon signal, while a display period and a touch period proceed simultaneously in the touch display device.

FIG. 6 is a diagram conceptually illustrating a case in which display failure occurs due to a beacon signal in a driving process in which a display period and a touch period simultaneously proceed in the touch display device.

Referring to FIG. 6, when the frame frequency of the touch display device according to the aspects of the present disclosure is 60 Hz, display driving and touch driving which turn on or turn off the pixel electrodes through N gate lines GL included in the touch screen panel TSP are simultaneously performed within a time period of 1/60 s.

When the touch screen panel TSP includes 1,280 gate lines GL, a display period in which the data voltage Vdata is applied to the 1,280 gate lines GL during one frame period (1/60 s) and a touch period in which touch driving is performed by the touch driving signal TDS are progressed together.

However, because the beacon signal Beacon transmitted from the touch screen panel TSP to the active stylus is generated at a frequency of 120 Hz, twice the frequency of 60 Hz, which is generally the frequency of the touch display device 100, there is a beacon period in which the beacon signal Beacon is generated within one frame period during which display driving and touch driving are performed.

The beacon period in which the beacon signal Beacon is generated may be changed within the touch period. However, when the beacon signal Beacon is to be generated in the middle of the display period and the touch period having a frequency of 60 Hz, one beacon period may be included in the middle of one frame period.

Meanwhile, the beacon signal Beacon may additionally be generated at the end of one frame period. However, since this period corresponds to a blank period of the frame period, it may not affect the display driving of the touch display device 100.

In the end, when the beacon period exists in the middle of one frame period, display failure occurs during the beacon period. If display driving is temporarily stopped during the beacon period, deterioration or an operation error of the touch display device 100 may occur.

Because the beacon period may vary depending on a frequency and a position at which the beacon signal Beacon is generated, the configuration and arrangement of GIP driving circuits to avoid the beacon period may also be changed according to the beacon period.

Figure 7:
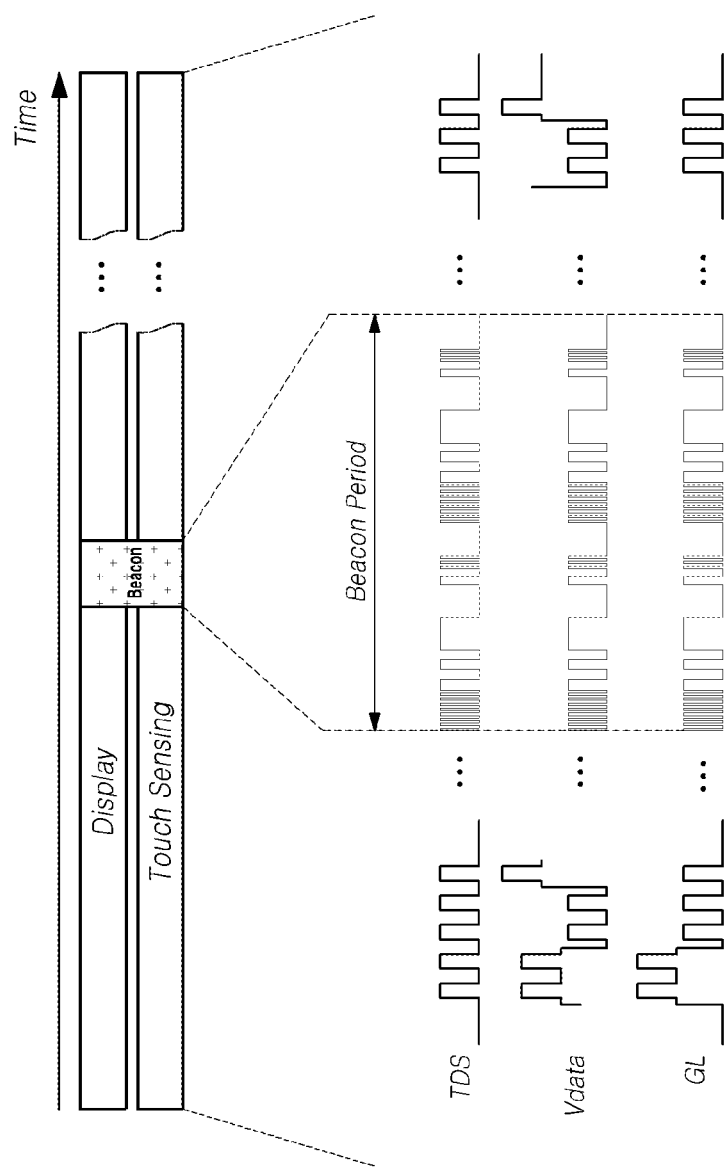
FIG. 7 is an exemplary diagram illustrating signal timings, when a touch driving signal, a data voltage, and a gate line signal are changed in a beacon period.

FIG. 7 is a signal timing diagram illustrating an exemplary case in which a touch driving signal, a data voltage, and a gate line signal change in a beacon period.

Referring to FIG. 7, the beacon signal Beacon includes information about the touch screen panel TSP, such as identification information of the touch screen panel TSP, state information of the touch screen panel TSP, and driving frequency. Therefore, it has different waveform from signals applied to the common electrode, the pixel electrodes, and the gate lines GL before and after the beacon period.

Therefore, the beacon period impairs display continuity and causes display failure.

To overcome this problem, a gate driving circuit may be divided into two or more GIP driving circuits so that the gate signal is not applied to the display panel in the beacon period in which the beacon signal Beacon is generated.

Figure 8:
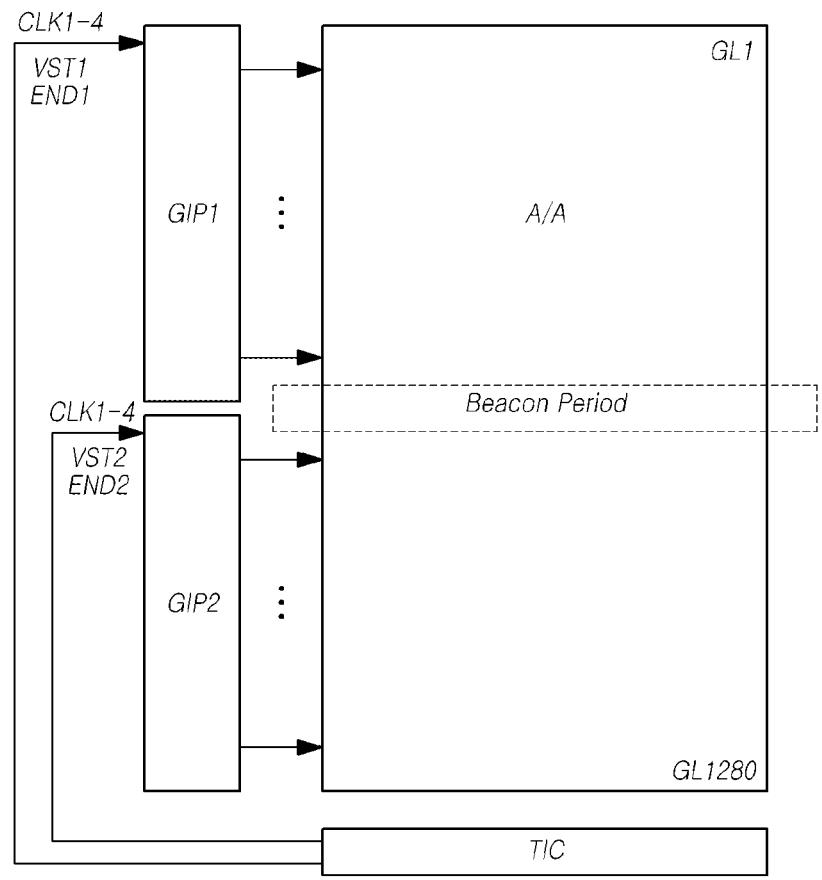
FIG. 8 is a block diagram illustrating a plurality of gate in panel (GIP) driving circuits divided from a gate driving circuit, to avoid a beacon period in the touch display device according to aspects of the present disclosure.

FIG. 8 is a block diagram illustrating a case in which a gate driving circuit is divided into a plurality of GIP driving circuits to avoid a beacon period in the touch display device according to aspects of the present disclosure.

Referring to FIG. 8, when a beacon period during which a beacon signal Beacon is generated is in the middle of one frame period, the gate driving circuit may be divided into a first GIP driving circuit GIP1 applying gate signals to first gate line GL1 to 640th gate line GL640 among a total of 1,280 gate lines GL included in the display panel, and a second GIP driving circuit GIP2 applying gate signals to 641th gate line GL641 to 1280th gate line GL1280 among the 1,280 gate lines GL included in the display panel.

Therefore, the beacon signal Beacon may be generated after the gate signal is applied to the first gate line GL1 to 640th gate line GL640 by the first GIP driving circuit GIP1, and the gate signal may be applied to the 641th gate line GL641 to 1280th gate line GL1280 by the second GIP driving circuit GIP2 after the beacon period ends, thereby preventing display failure which might otherwise be caused by the beacon signal Beacon.

A first GIP driving circuit GIP1 and a second GIP driving circuit GIP2 may be arranged in a row on the left or right side of the display panel or respectively on both sides of the display panel.

In this structure, four gate clocks, one start pulse, and one end signal may be applied to each of the first GIP driving circuit GIP1 and the second GIP driving circuit GIP2.

For example, when the first GIP driving circuit GIP1 and the second GIP driving circuit GIP2 are disposed together on the left side of the touch display device 100 of the present disclosure, the first GIP driving circuit GIP1 may be located at the top left of the display panel, and the second GIP driving circuit GIP2 may be located at the bottom left of the display panel.

A plurality of clocks (e.g., CLK1 to CLK4), one start pulse VST1, and one end signal END1 may be applied to the first GIP driving circuit GIP1 located at the top left. A plurality of clocks (e.g., CLK1 to CLK4), one even-numbered start pulse VST2, and one even-numbered end signal END2 may be applied to the second GIP driving circuit GIP2 located at the bottom left.

The signals applied to the first GIP driving circuit GIP1 and the second GIP driving circuit GIP2 may be changed in position, and the numbers of start pulses and end signals applied to the first GIP driving circuit GIP1 and the second GIP driving circuit GIP2 may be changed.

Figure 9:
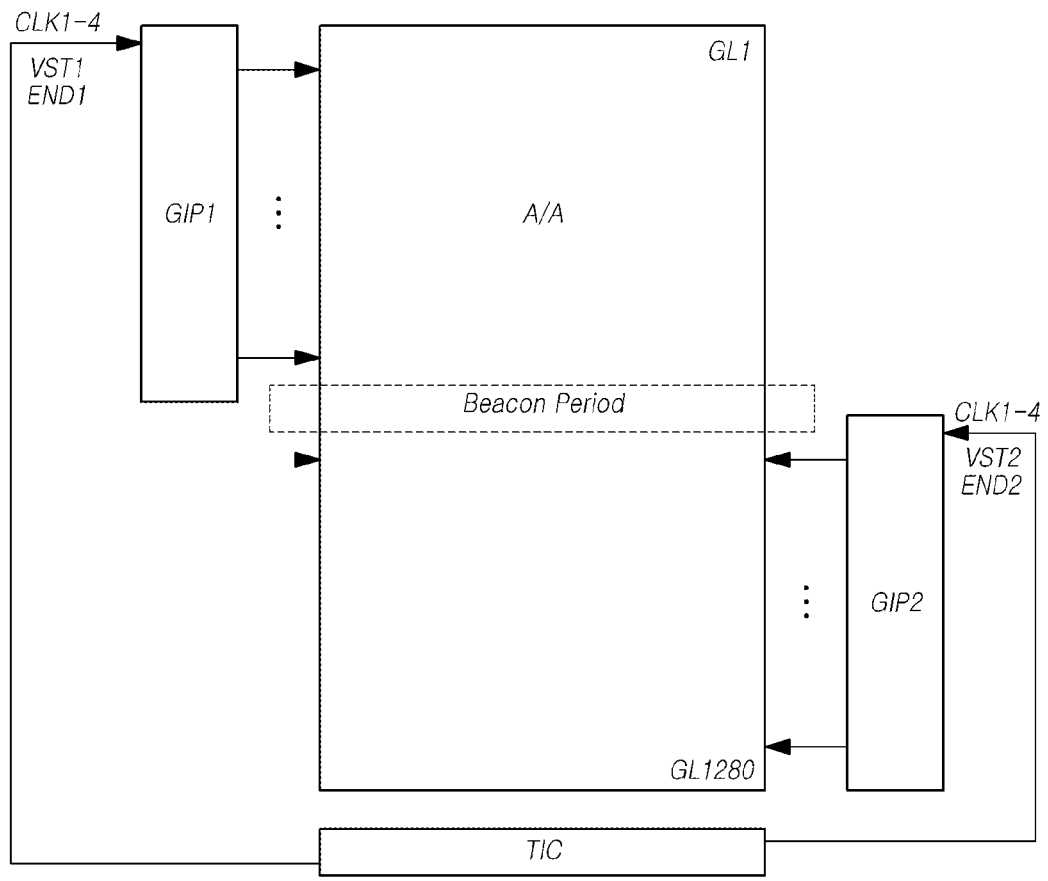
FIG. 9 is a block diagram illustrating arrangement of a plurality of GIP driving circuits, separately on the left and right sides of a display panel, to avoid a beacon period in the touch display device according to aspects of the present disclosure.

FIG. 9 is a block diagram illustrating a case in which a plurality of GIP driving circuits are separately arranged on the left and right sides of the display panel to avoid a beacon period in the touch display device according to aspects of the present disclosure.

As in the illustrated case of FIG. 8, when a beacon period in which the beacon signal Beacon is generated is defined in the middle of one frame period, a gate driving circuit may be divided into a first GIP driving circuit GIP1 applying the gate signal to first gate line GL1 to 640th gate line GL640 among a total of 1,280 gate lines GL included in the display panel, and a second GIP driving circuit GIP2 applying the gate signal to 641th gate line GL641 to 1280th gate line GL1280 among the 1,280 gate lines GL included in the display panel.

However, the first GIP driving circuit GIP1 may be disposed on the left side of the display panel, to apply the gate signal to the first gate line GL1 to 640th gate line GL640, and the second GIP driving circuit GIP2 may be disposed on the right side of the display panel, to apply the gate signal to the 641th gate line GL641 to 1280th gate line GL1280.

Therefore, the beacon signal Beacon may be generated after the gate signal is applied to the first gate line GL1 to 640th gate line GL640 by the first GIP driving circuit GIP1, and the gate signal may be applied to the 641th gate line GL641 to 1280th gate line GL1280 by the second GIP driving circuit GIP2 after the beacon period ends, thereby preventing display failure which might otherwise be caused by the beacon signal Beacon.

Similarly, four gate clocks, one start pulse, and one end signal may be applied to the first GIP driving circuit GIP1 and the second GIP driving circuit GIP2, respectively.

Figure 10:
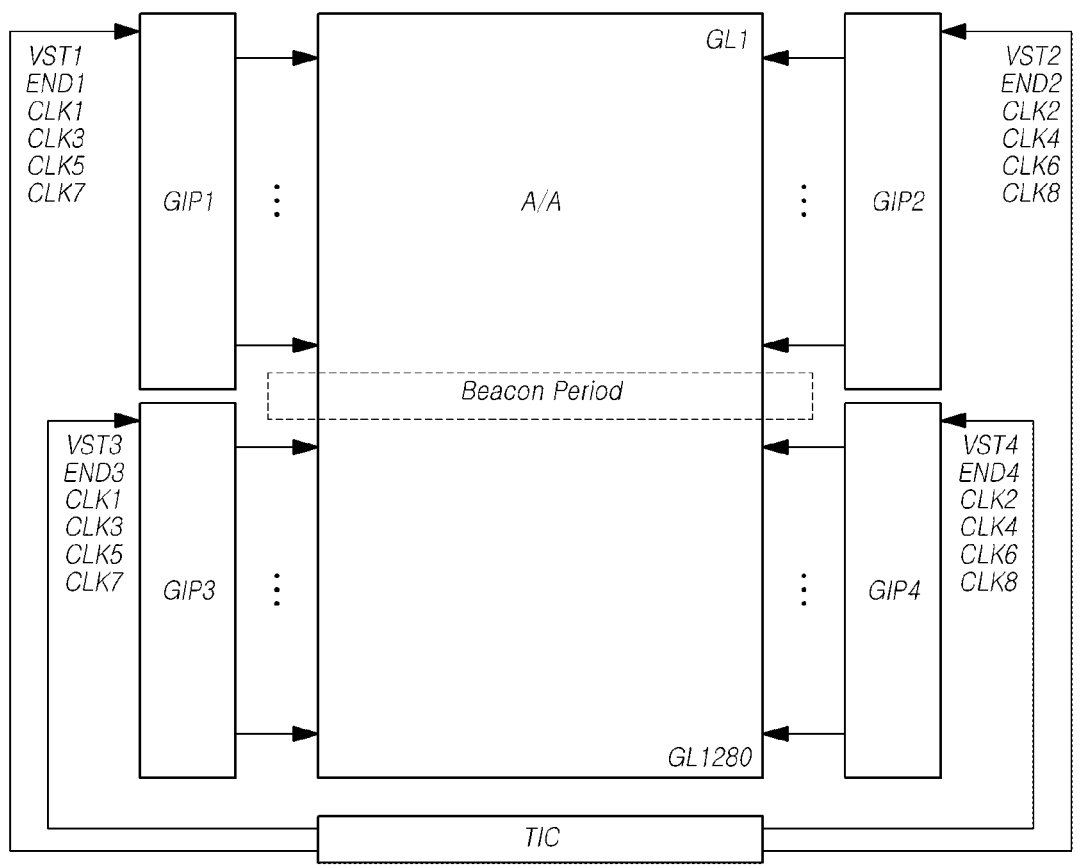
FIG. 10 is a block diagram illustrating arrangement of a plurality of GIP driving circuits, separately on the left and right sides of the display panel, to avoid a beacon period in the touch display device according to aspects of the present disclosure.

FIG. 10 is a block diagram illustrating a case in which a plurality of GIP driving circuits are separately arranged on the left and right sides of the display panel to avoid a beacon period in the touch display device according to aspects of the present disclosure.

Referring to FIG. 10, when a beacon period in which the beacon signal Beacon is generated is defined in the middle of one frame period, first GIP driving circuit GP1 and second GIP driving circuit GIP2 may be disposed to apply the gate signal to first gate line GL1 to 640th gate line GL640 among a total of 1,280 gate lines GL included in the display panel, and third GIP driving circuit GIP3 and fourth GIP driving circuit GIP4 may be disposed to apply the gate signal to 641th gate line GL641 to 1280th gate line GL1280 among the 1,280 gate lines GL included in the display panel.

Therefore, the beacon signal Beacon may be generated after the gate signal is applied to the first gate line GL1 to 640th gate line GL640 by the first GIP driving circuit GIP1 and second GIP driving circuit GIP2, and the gate signal may be applied to the 641th gate line GL641 to 1280th gate line GL1280 by the third GIP driving circuit GIP3 and fourth GIP driving circuit GIP4 after the beacon period ends, thereby preventing display failure which might otherwise be caused by the beacon signal Beacon.

The first GIP driving circuit GIP1 and the second GIP driving circuit GIP2, which apply the gate signal to the first gate line GL1 to 640th gate line GL640, may be disposed at the top left and top right of the display panel, respectively.

A plurality of odd-numbered clocks (e.g., CLK1, CLK3, CLK5, and CLK 7), one odd-numbered start pulse VST1, and one odd-numbered end signal END1 may be applied to the first GIP driving circuit GIP1, and a plurality of even-numbered clocks (e.g., CLK2, CLK4, CLK6, and CLK 8), one even-numbered start pulse VST2, and one even-numbered end signal END2 may be applied to the second GIP driving circuit GIP2, so that the first GIP driving circuit GIP1 and the second GIP driving circuit GIP2 may alternately apply the gate signal to the first gate line GL1 to 640th gate line GL640.

The third GIP driving circuit GIP3 and the fourth GIP driving circuit GIP4, which apply the gate signal to the 641th gate line GL641 to 1280th gate line GL1280, may be disposed at the bottom left and bottom right of the display panel, respectively.

Similarly, a plurality of odd-numbered clocks (e.g., CLK1, CLK3, CLK5, and CLK 7), one odd-numbered start pulse VST3, and one odd-numbered end signal END3 may be applied to the third GIP driving circuit GIP3, and a plurality of even-numbered clocks (e.g., CLK2, CLK4, CLK6, and CLK 8), one even-numbered start pulse VST4, and one even-numbered end signal END4 may be applied to the fourth GIP driving circuit GIP4, so that the third GIP driving circuit GIP3 and the fourth GIP driving circuit GIP4 may alternately apply the gate signal to the 641th gate line GL641 to 1280th gate line GL1280.

Figure 11:
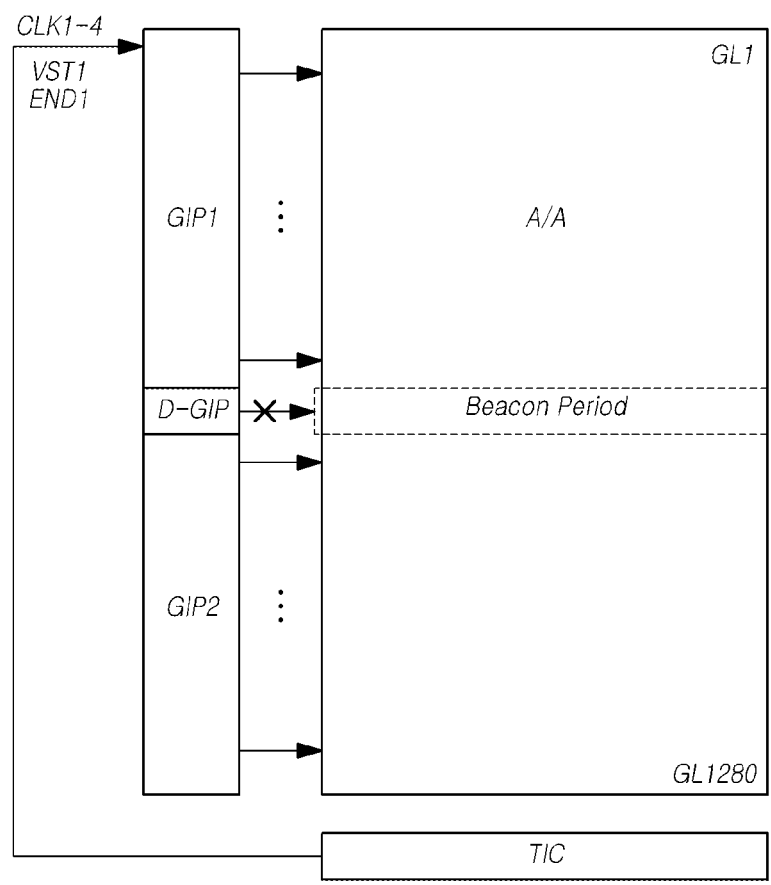
FIG. 11 is a block diagram illustrating a gate driving circuit including a dummy GIP driving circuit in correspondence with a beacon period in the touch display device according to aspects of the present disclosure.

FIG. 11 is a block diagram illustrating a case in which a gate driving circuit including a dummy GIP driving circuit in correspondence with a beacon period is disposed in the touch display device according to aspects of the present disclosure.

Referring to FIG. 11, a dummy GIP driving circuit D-GIP may be disposed in the gate driving circuit, in correspondence with a beacon period in which the beacon signal Beacon is generated in the touch display device of the present disclosure.

Therefore, the gate driving circuit may include the dummy GIP driving circuit D-GIP which does not generate the gate signal corresponding to the beacon period, a first GIP driving circuit GIP1 which is located at the front end of the dummy GIP driving circuit D-GIP and applies the gate signal through corresponding gate lines GL, and a second GIP driving circuit GIP2 which is located at the rear end of the dummy GIP driving circuit D-GIP and applies the gate signal through corresponding gate lines GL.

For example, when a beacon period during which the beacon signal Beacon is generated is in the middle of one frame period, the gate driving circuit may be divided into the first GIP driving circuit GIP1 applying the gate signal to first gate line GL1 to 640th gate line GL640 among a total of 1,280 gate lines GL included in the display panel, and the second GIP driving circuit GIP2 applying the gate signal to 641th gate line GL641 to 1280th gate line GL1280 among the total of 1,280 gate lines GL included in the display panel. The dummy GIP driving circuit D-GIP may be disposed between the first GIP driving circuit GIP1 and the second GIP driving circuit GIP2.

Therefore, the beacon signal Beacon may be generated after the gate signal is applied to the first gate line GL1 to 640th gate line GL640 by the first GIP driving circuit GIP1. However, in the beacon period, the gate signal may not be transferred to the gate lines GL by the dummy GIP driving circuit D-GIP.

After the beacon period ends, the gate signal may be applied to the 641th gate line GL641 to 1280th gate line GL1280 by the second GIP driving circuit GIP2, thereby preventing display failure which might otherwise be caused by the beacon signal Beacon.

Since the first GIP driving circuit GIP1 and the second GIP driving circuit GIP2 are electrically coupled to each other by the dummy GIP driving circuit D-GIP, a plurality of gate clocks (e.g., CLK1 to CLK4), one start pulse VST1, and one end signal END1 may be applied.

Figure 12:
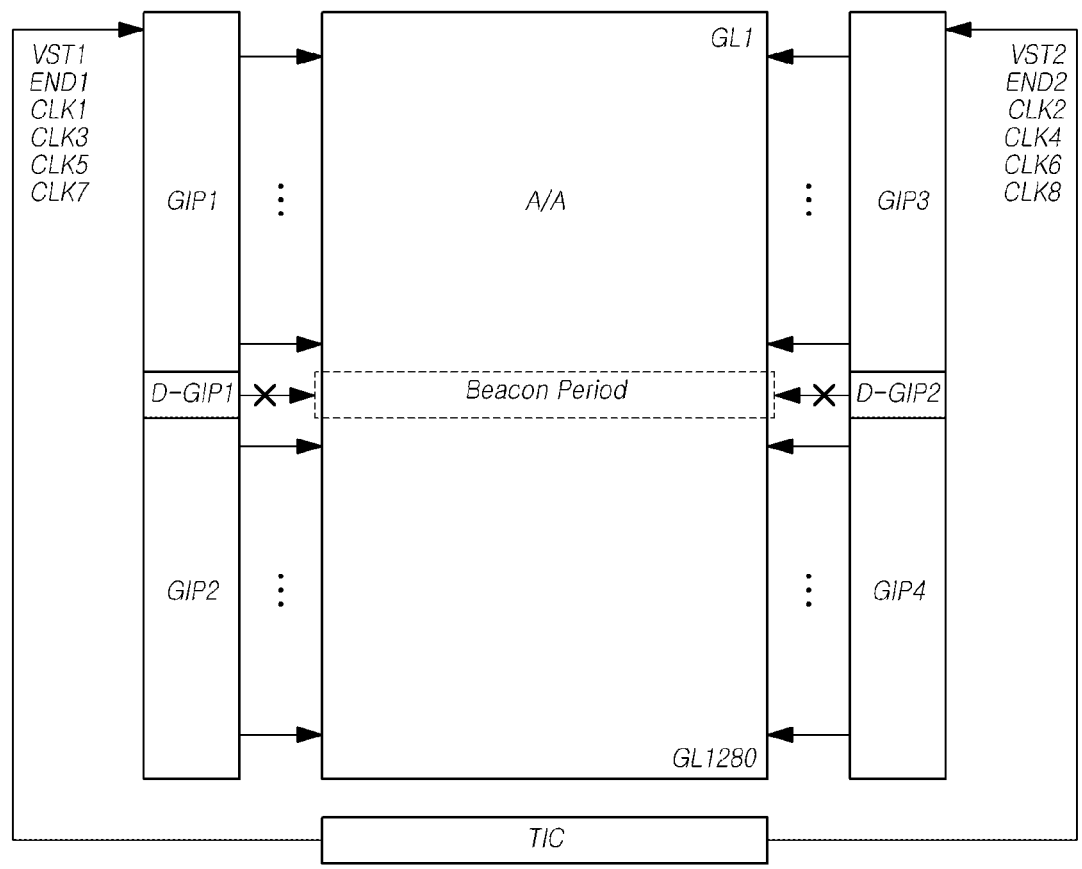
FIG. 12 is a block diagram illustrating gate driving circuits disposed on the left and right sides of the display panel, each gate driving circuit including a dummy GIP driving circuit in correspondence with a beacon period in the touch display device according to aspects of the present disclosure.

FIG. 12 is a block diagram illustrating a case in which gate driving circuits each including a dummy GIP driving circuit corresponding to a beacon period are arranged on both sides of the display panel in the touch display device according to aspects of the present disclosure.

Referring to FIG. 12, in the touch display device of the present disclosure, a dummy GIP driving circuit D-GIP may be disposed in each gate driving circuit, in correspondence with a beacon period in which the beacon signal Beacon is generated, and gate driving circuits each including a dummy GIP driving circuit D-GIP may be disposed on the left and right sides of the display panel.

Therefore, a first gate driving circuit disposed on the left side of the display panel may include a first dummy GIP driving circuit D-GIP1 which does not generate the gate signal corresponding to the beacon period, a first GIP driving circuit GIP1 which is located at the front end of the first dummy GIP driving circuit D-GIP and applies the gate signal through corresponding gate lines GL, and a second GIP driving circuit GIP2 which is located at the rear end of the first dummy GIP driving circuit D-GIP and applies the gate signal through corresponding gate lines GL.

Likewise, a second gate driving circuit disposed on the right side of the display panel may include a second dummy GIP driving circuit D-GIP2 which does not generate the gate signal corresponding to the beacon period, a third GIP driving circuit GIP3 which is located at the front end of the second dummy GIP driving circuit D-GIP2 and applies the gate signal through corresponding gate lines GL, and a fourth GIP driving circuit GIP4 which is located at the rear end of the second dummy GIP driving circuit D-GIP2 and applies the gate signal through corresponding gate lines GL.

For example, when the beacon period during which the beacon signal Beacon is generated is in the middle of one frame period, the first gate driving circuit may be divided into the first GIP driving circuit GIP1 applying the gate signal to first gate line GL1 to 640th gate line GL640 among a total of 1,280 gate lines GL included in the display panel, and the second GIP driving circuit GIP2 applying the gate signal to 641th gate line GL641 to 1280th gate line GL1280 among the 1,280 gate lines GL included in the display panel. The first dummy GIP driving circuit D-GIP1 may be disposed between the first GIP driving circuit GIP1 and the second GIP driving circuit GIP2.

Further, the second gate driving circuit may be divided into the third GIP driving circuit GIP3 applying the gate signal to the first gate line GL1 to 640th gate line GL640 among the 1,280 gate lines GL included in the display panel, and the fourth GIP driving circuit GIP4 applying the gate signal to the 641th gate line GL641 to 1280th gate line GL1280 among the 1,280 gate lines GL included in the display panel. The second dummy GIP driving circuit D-GIP2 may be disposed between the third GIP driving circuit GIP3 and the fourth GIP driving circuit GIP4.

Therefore, the beacon signal Beacon may be generated after the gate signal is applied to the first gate line GL1 to 640th gate line GL640 by the first GIP driving circuit GIP1. Therefore, the gate signal may not be transferred to the gate lines GL by the first dummy GIP driving circuit D-GIP1 in the beacon period.

After the beacon period ends, the gate signal may be applied to the 641th gate line GL641 to 1280th gate line GL1280 by the second GIP driving circuit GIP2, thereby preventing display failure which might otherwise be caused by the beacon signal Beacon.

Since the first GIP driving circuit GIP1 and the second GIP driving circuit GIP2 are electrically coupled to each other by the first dummy GIP driving circuit D-GIP1, the first GIP driving circuit GIP1 and the second GIP driving circuit GIP2 may share a plurality of gate clocks (e.g., CLK1, CLK3, CLK5, and CLK7), one start pulse VST1, and one end signal END1.

Further, since the third GIP driving circuit GIP3 and the fourth GIP driving circuit GIP4 are electrically coupled to each other by the second dummy GIP driving circuit D-GIP2, the third GIP driving circuit GIP3 and the fourth GIP driving circuit GIP4 may share a plurality of gate clocks (e.g., CLK2, CLK4, CLK6, and CLK8), one start pulse VST2, and one end signal END2.

In this structure, the first GIP driving circuit GIP1 and the third GIP driving circuit GIP3 may alternately apply the gate signal to the first gate line GL1 to 640th gate line GL640. Therefore, a plurality of odd-numbered gate clocks (e.g., CLK1, CLK3, CLK5, and CLK7) may be applied to the first GIP driving circuit GIP1, and a plurality of even-numbered gate clocks (e.g., CLK2, CLK4, CLK6, and CLK8) may be applied to the third GIP driving circuit GIP3.

Likewise, the second GIP driving circuit GIP2 and the fourth GIP driving circuit GIP4 may alternately apply the gate signal to the 641th gate line GL641 to 1280th gate line GL1280. Therefore, the plurality of odd-numbered gate clocks (e.g., CLK1, CLK3, CLK5, and CLK7) may be applied to the second GIP driving circuit GIP2, and the plurality of even-numbered gate clocks (e.g., CLK2, CLK4, CLK6, and CLK8) may be applied to the fourth GIP driving circuit GIP4.

Therefore, the beacon signal Beacon may be generated after the gate signal is applied to the first gate line GL1 to 640th gate line GL640 by the third GIP driving circuit GIP3. However, the gate signal may not be transferred to the gate lines GL by the second dummy GIP driving circuit D-GIP2 in the beacon period.

After the beacon period ends, the gate signal may be applied to the 641th gate line GL641 to 1280th gate line GL1280 by the fourth GIP driving circuit GIP4, thereby preventing display failure which might otherwise be caused by the beacon signal Beacon.

The beacon period of the display panel may vary according to a frequency and a position at which the beacon signal Beacon is generated. Therefore, the configuration and arrangement of GIP driving circuits for avoiding the beacon period may vary according to a communication protocol by which the beacon signal Beacon is generated for an active stylus.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
    a display panel having a built-in touch screen panel including a plurality of touch electrodes;
    a gate driving circuit configured to supply a gate signal to a plurality of gate lines;
    a data driving circuit configured to supply a data voltage to a plurality of data lines; and
    a touch circuit configured to supply a touch driving signal to the display panel and sense a pen touch of an active stylus based on a signal received in response to the touch driving signal,
    wherein the gate driving circuit comprises a first gate driving circuit configured to supply the gate signal to a first part of the plurality of gate lines before a beacon period in which a beacon signal for the active stylus is generated, and a second gate driving circuit configured to supply the gate signal to a second part of the plurality of gate lines after the beacon period ends,
    wherein the beacon period is placed in a middle portion of one frame period including a display period and a touch period,
    wherein the display period in which display driving is performed and the touch period in which touch driving is performed take place simultaneously while the first gate driving circuit supplies the gate signal to the first part of the plurality of gate lines and the second gate driving circuit supplies the gate signal to the second part of the plurality of gate lines.

2. The touch display device according to claim 1, wherein the first gate driving circuit and the second gate driving circuit are gate in panel (GIP) driving circuits.

3. The touch display device according to claim 1, wherein the first gate driving circuit is disposed at least at one upper side of the display panel, and is configured to supply the first part of the plurality of gate signal to the gate lines by a plurality of clocks, one or more start pulses, and one or more end signals.

4. The touch display device according to claim 3, wherein the first gate driving circuit comprises:
    a first left gate driving circuit disposed at an upper left side of the display panel; and
    a first right gate driving circuit disposed at a upper right side of the display panel,
    wherein the plurality of clocks are applied to the first left gate driving circuit and the first right gate driving circuit to alternately drive the first left gate driving circuit and the first right gate driving circuit.

5. The touch display device according to claim 1, wherein the second gate driving circuit is disposed at least at one lower side of the display panel, and supplies the gate signal to the second part of the plurality of gate lines by a plurality of clocks, one or more start pulses, and one or more end signals.

6. The touch display device according to claim 5, wherein the second gate driving circuit comprises:
   a second left gate driving circuit disposed at a bottom left side of the display panel; and
   a second right gate driving circuit disposed at a bottom right side of the display panel,
   wherein the plurality of clocks are applied to the second left gate driving circuit and the second right gate driving circuit to alternately drive the second left gate driving circuit and the second right gate driving circuit.

7. The touch display device according to claim 1, wherein the gate driving circuit further comprising a first dummy gate driving circuit corresponding to the beacon period in which the beacon signal for the active stylus is generated.

8. The touch display device according to claim 7, wherein the first dummy gate driving circuit, the first gate driving circuit, and the second gate driving circuit are gate in panel (GIP) driving circuits.

9. The touch display device according to claim 7, wherein the first dummy gate driving circuit does not supply the gate signal to the display panel in the beacon period.

10. The touch display device according to claim 7, wherein the first dummy gate driving circuit, the first gate driving circuit, and the second gate driving circuit are disposed on the same side of the display panel, and the first gate driving circuit and the second gate driving circuit share a plurality of clocks, one or more start pulses, and one or more end signals through the first dummy gate driving circuit electrically coupled to the first gate driving circuit and the second gate driving circuit.

11. The touch display device according to claim 10, further comprising:
   a third gate driving circuit opposite to the first gate driving circuit with respect to the display panel;
   a fourth gate driving circuit opposite to the second gate driving circuit with respect to the display panel; and
   a second dummy gate driving circuit opposite to the first dummy gate driving circuit with respect to the display panel,
   wherein the second dummy gate driving circuit, the third gate driving circuit, and the fourth gate driving circuit are disposed on the same side of the display panel, and the third gate driving circuit and the fourth gate driving circuit share a plurality of clocks, one or more start pulses, and one or more end signals through the second dummy gate driving circuit electrically coupled to the third gate driving circuit and the fourth gate driving circuit.

12. A driving circuit in a touch display device including a display panel having a built-in touch screen panel including a plurality of touch electrodes, a data driving circuit configured to supply a data voltage to a plurality of data lines, and a touch circuit configured to supply a touch driving signal to the display panel and sensing a pen touch of an active stylus based on a signal received in response to the touch driving signal, the driving circuit comprising:
   a first gate driving circuit configured to supply a gate signal to a first part of a plurality of gate lines before a beacon period in which a beacon signal for the active stylus is generated; and
   a second gate driving circuit configured to supply the gate signal to a second part of the plurality of gate lines after the beacon period ends,
   wherein the beacon period is placed in a middle portion of one frame period including a display period and a touch period,
   wherein the display period in which display driving is performed and the touch period in which touch driving is performed take place simultaneously while the first gate driving circuit supplies the gate signal to the first part of the plurality of gate lines and the second gate driving circuit supplies the gate signal to the second part of the plurality of gate lines.

13. The driving circuit according to claim 12, further comprising a first dummy gate driving circuit corresponding to the beacon period in which the beacon signal for the active stylus is generated,
   wherein the first dummy gate driving circuit, the first gate driving circuit, and the second gate driving circuit are disposed on the same side of the display panel, and the first gate driving circuit and the second gate driving circuit share a plurality of clocks, one or more start pulses, and one or more end signals through the first dummy gate driving circuit electrically coupled to the first gate driving circuit and the second gate driving circuit.

14. The driving circuit according to claim 13, further comprising:
   a third gate driving circuit opposite to the first gate driving circuit with respect to the display panel;
   a fourth gate driving circuit opposite to the second gate driving circuit with respect to the display panel; and
   a second dummy gate driving circuit opposite to the first dummy gate driving circuit with respect to the display panel,
   wherein the second dummy gate driving circuit, the third gate driving circuit, and the fourth gate driving circuit are disposed on the same side of the display panel, and the third gate driving circuit and the fourth gate driving circuit share a plurality of clocks, one or more start pulses, and one or more end signals through the second dummy gate driving circuit electrically coupled to the third gate driving circuit and the fourth gate driving circuit.

15. The driving circuit according to claim 14, wherein the first and second dummy gate driving circuits, the first gate driving circuit, the second gate driving circuit, the third gate driving circuit and the fourth gate driving circuit are gate in panel (GIP) driving circuits.

16. The driving circuit according to claim 14, wherein the first and second dummy gate driving circuits do not supply the gate signal to the display panel in the beacon period.

17. A driving method of a touch display device including a display panel having a built-in touch screen panel including a plurality of touch electrodes, a first gate driving circuit and a second gate driving circuit supplying a gate signal to a plurality of gate lines, a data driving circuit supplying a data voltage to a plurality of data lines, and a touch circuit supplying a touch driving signal to the display panel and sensing a pen touch of an active stylus based on a signal received in response to the touch driving signal, the driving method comprising:
   supplying, by the first gate driving circuit, the gate signal to a part of the plurality of gate lines before a beacon period in which a beacon signal for the active stylus is generated; and
   supplying, by the second gate driving circuit, the gate signal to another part of the plurality of gate lines after the beacon period ends, wherein the beacon period is placed in a middle portion of one frame period including a display period and a touch period, and wherein the display period in which display driving is performed and the touch period in which touch driving is performed take place simultaneously while the first gate driving circuit supplies the gate signal to the part of the plurality of gate lines and the second gate driving circuit supplies the gate signal to the another part of the plurality of gate lines.

* * * * *